(12) United States Patent
Kobacker, II et al.

(10) Patent No.: US 6,318,956 B1
(45) Date of Patent: Nov. 20, 2001

(54) PRODUCT UNIT-DELIVERY APPARATUS (75) Inventors: Alfred J. Kobacker, II, Columbus; George Hartig; Jeffrey L. Spring, both of Grove City; Gary P. Zimmerman, Pataskala, all of OH (US)

(73) Assignee: Ideanamics, LLC, Columbus, OH (US)

( * ) Notice: Subject to any disclaimer, the term of this patent is extended or adjusted under 35 U.S.C. 154(b) by 0 days.

(21) Appl. No.: 09/542,333

(22) Filed: Apr. 4, 2000

(51) Int. Cl.[7] .................................................. B65G 59/00
(52) U.S. Cl. ............................................................ 414/798.9
(58) Field of Search ................................. 414/900, 798.9

(56) References Cited

U.S. PATENT DOCUMENTS 4,285,621 * 8/1981 Spencer ............................... 414/45 X
5,281,082 * 1/1994 Ghilardi ............................. 414/798.9
6,146,087 * 11/2000 Perry ................................. 414/798.9

* cited by examiner

*Primary Examiner*—Christopher P. Ellis
*Assistant Examiner*—Kenneth W Bower
(74) *Attorney, Agent, or Firm*—Thomas S. Baker, Jr.

(57) ABSTRACT

The product unit-delivery apparatus of the present invention is basically comprised of a product unit-feeder subassembly, a co-operating product unit-picker subassembly, a continuously operating electric drive motor, a drive train which intermittently and simultaneously provides the power output of the apparatus electric drive motor to the unit-feeder and unit-picker subassemblies, and adjustment components for readily adapting the apparatus to the picking of product units having different heights, different widths, or different thicknesses at very high product unit picking rates.

15 Claims, 11 Drawing Sheets

PRODUCT UNIT-DELIVERY APPARATUS

CROSS-REFERENCES

None

FIELD OF THE INVENTION

This invention pertains generally to automated order-filling systems, and particularly concerns improved product unit-delivery apparatus and apparatus operating methods that may be advantageously utilized in such systems to pick and deliver different quantities of units of a product to adjacent order-receiving containers at very-high unit delivery rates (e.g., 180 product units per minute), with ready adaptation to numerous differently-sized products, and without causing damage to product units.

BACKGROUND OF THE INVENTION

Automated product order-filling systems are generally well known, and typically involve the operation of a serees of product unit delivery machines that in sequence deliver different computer-controlled quantities of units of different products to adjacent order-receiving containers such as open shipping boxes as the containers are sequentially, intermittently, and incrementally indexed past the product unit delivery machine delivery outlets by cooperating, computer-controlled conveyor equipment.

One particular machine known to applicants is the article dispensing machine disclosed in U.S. Pat. No. 5,046,641 issued to Gray. Such machine is designed to dispense newspapers and similar items. The prior art machine has no capability for adjustment to deliver product units having a different thickness, in large part because it does not dispense articles through an adjustable gap between a unit-feeder subassembly and a unit-picker subassembly. In Gray a feed subassembly simply advances a product unit into picker subassembly which moves the unit in a transverse direction away from the intersection of the two subassemblies.

Other prior art apparatus known to Applicants includes the lift system of U.S. Pat. No. 5,626,335 granted to Bulka et al., and the tthe book stacker disclosed U.S. Pat. No. 4,525,118 issued to Bulka et al., and the two-axis article loader/unloader of U.S. Pat. No. 5,611,193 granted to Farrelly.

Such machines have heretofore posed a number of substantial operating problems that have remained unaddressed by the automation industry, including unnecessarily low rates of product unit-picking, inability to be quickly changed to accommodate differently-sized products in a particular unit-picker apparatus, and causing product unit damage, especially when high picking rates are involved.

We have discovered a novel construction for a product unit-delivery assembly which clearly avoids the shortcomings of the known prior art automated product delivery equipment.

Other advantages and objectives of the present invention will become apparent from consideration of the detailed descriptions, drawings, and claims which follow.

SUMMARY OF THE INVENTION

The product unitlivery apparatus of the present invention is basically an assembly comprised of a product unit-feeder subassembly, a co-operating product unit-picker subassembly, a continuously-operating electric drive motor, a drive train which provides the power output of the apparatus electric drive motor intermittently to the unit-feeder and unit-picker subassemblies, and adjustment components for readily adapting the apparatus to the efficient and reliable picking of product units having different heights, different widths, or different thicknesses at very high unit picking rates.

DETAILED DESCRIPTION

The product unit-delivery apparatus of the present invention is typically utilized in automated order-filling equipment systems in which pre-programmed, computer-generated signals are directed to the equipment product unit delivery machines to control alternate activation and deactivation that obtains picking and delivery of varied quantities of product units. Normally an open shipping container is moved incrementally along by a conventional conveyor and stopped at each system product unit delivery machine product discharge chute for a brief time so that the machine unit-picker subassembly may be activated by a conventional computer-controlled input signal to pick and deliver to the open shipping container the prescribed number of units of a particular product required by the order then being filled. Such shipping container is then advanced by its computer-controlled conveyor to the next product unit delivery machine in the order-filling system battery or series of product unit delivery machines where, if required by the pertinent order, it is provided with the required number of units of a different product. Typically, the product unit delivery apparatus of the present invention may be readily adjusted and utilized to efficiently pick different products from a range of books, pamphlets, pre-packaged audio compact discs, pre-packaged data compact discs, pre-packaged video cassettes, and the like. Delivery of a pre-determined quantity of product units is accomplished by the apparatus incrementally and at rates of up to 180 product units per minute using state-of-the-art system components.

As illustrated in FIGS. 1 through 5 of the drawings, our product unit-delivery apparatus invention 10 is basically comprised of a rigid structural frame assembly 12 mounted on base element 14, a unit-feeder subassembly 16 supported by frame 12, and a co-operating unit-picker subassembly 18 that also is supported by frame element 12. A conventional electric motors 20 is supported by base element 14 and functions to power system 10 through the drive train 22 that co-operatively connects the output shaft of electric motor 20 to unit-feeder subassembly 16 and to unit-picker subassembly 18.

Figure 1:
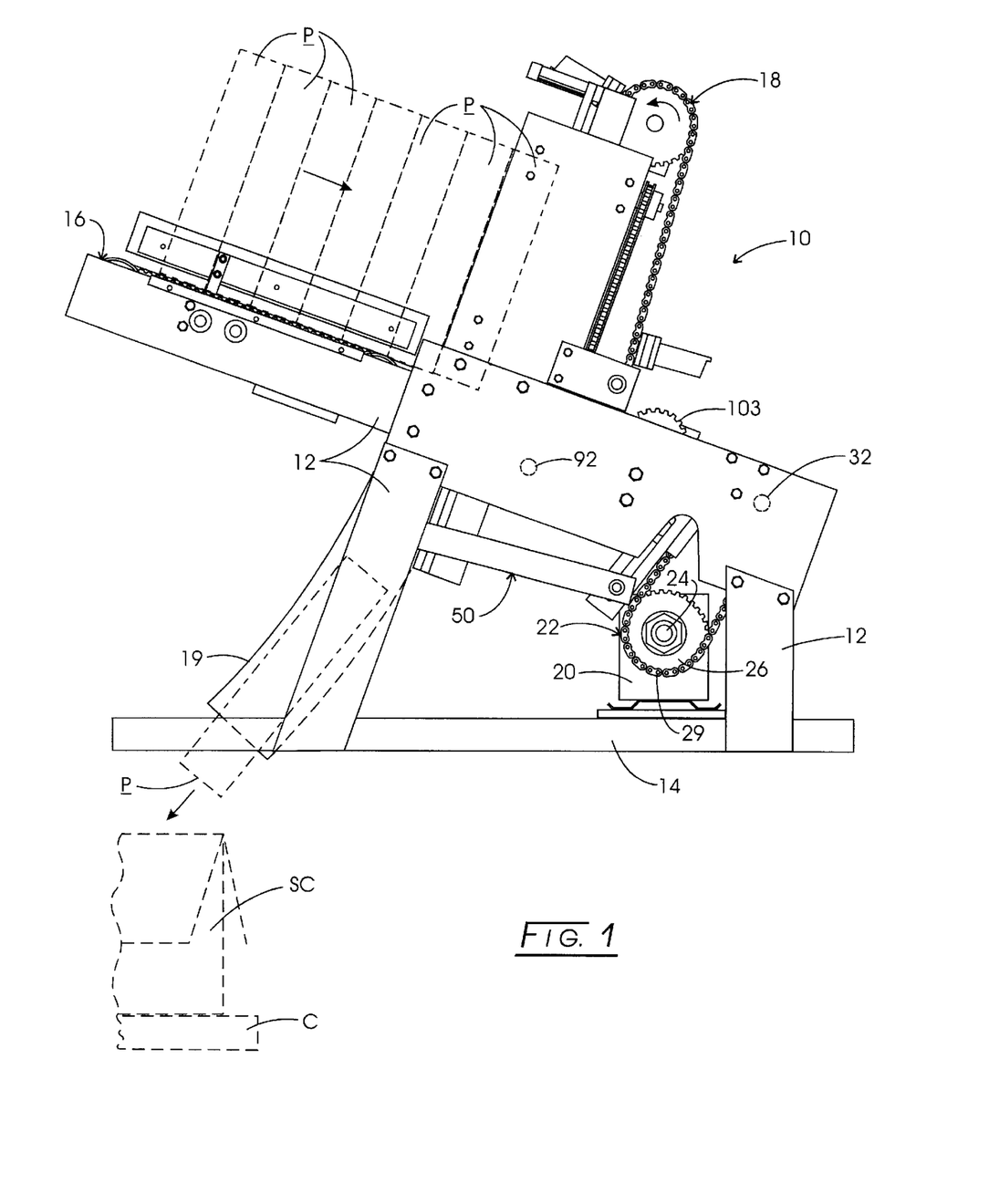
FIG. 1 is a schematic side elevation view of a preferred embodiment of the product unit-delivery apparatus of the present invention.

Also shown in FIG. 1 is the product unit delivery apparatus deflector-like, delivery chute 19 which receives successive units of product P from unit-picker subassembly 18 for delivery to the shipping container SC that is positioned in place by conveyor C. Delivery chute 19 co-operates with an adjustable-width apparatus product unit delivery gap that exists between subassemblies 16 and 18 and that is later described in connection with FIGS. 12 and 13. Unit-feeder subassembly 16 normally has a proportionally much greater length than that schematically illustrated in the drawings and typically supports a far greater number of product units P than the relatively few shown in outline in FIG. 1 and thereby minimizes the need of frequent subassembly filling with product units taken from product inventory. If desired, an additional conveyor or conveyors can be added to apparatus 10 in series with subassembly 16.

Drive train 22 includes the output shaft 24 of electric motor 20 and its attached drive sprocket 26, driven sprocket 28 keyed to a conventional electromagnetic clutch mechanism 30, an endless chain 29 that interconnects sprockets 26 and 28, and an output shaft 32 that is incrementally activated and driven by clutch mechanism 30 and that has a rigidly attached output sprocket 34 which drives unit-picker subassembly 18 and a rigidly attach output cam 36 that drives unit-feeder subassembly 16. Electromagnetic clutch mechanism 30 is a so-called state-of-the-art "one-revolution" device; when computer-controlled through one cycle of activation and deactivation to cause picking and delivery of one unit of product, mechanism 30 effects but one complete revolution of connected output shaft 32 by electric motor 20 and power train 22. Also, clutch mechanism 30 is basically activated/deactivated in response to electrical/electronic input signals received by apparatus 10 from a computer-controlled automated order filling system.

Figure 2:
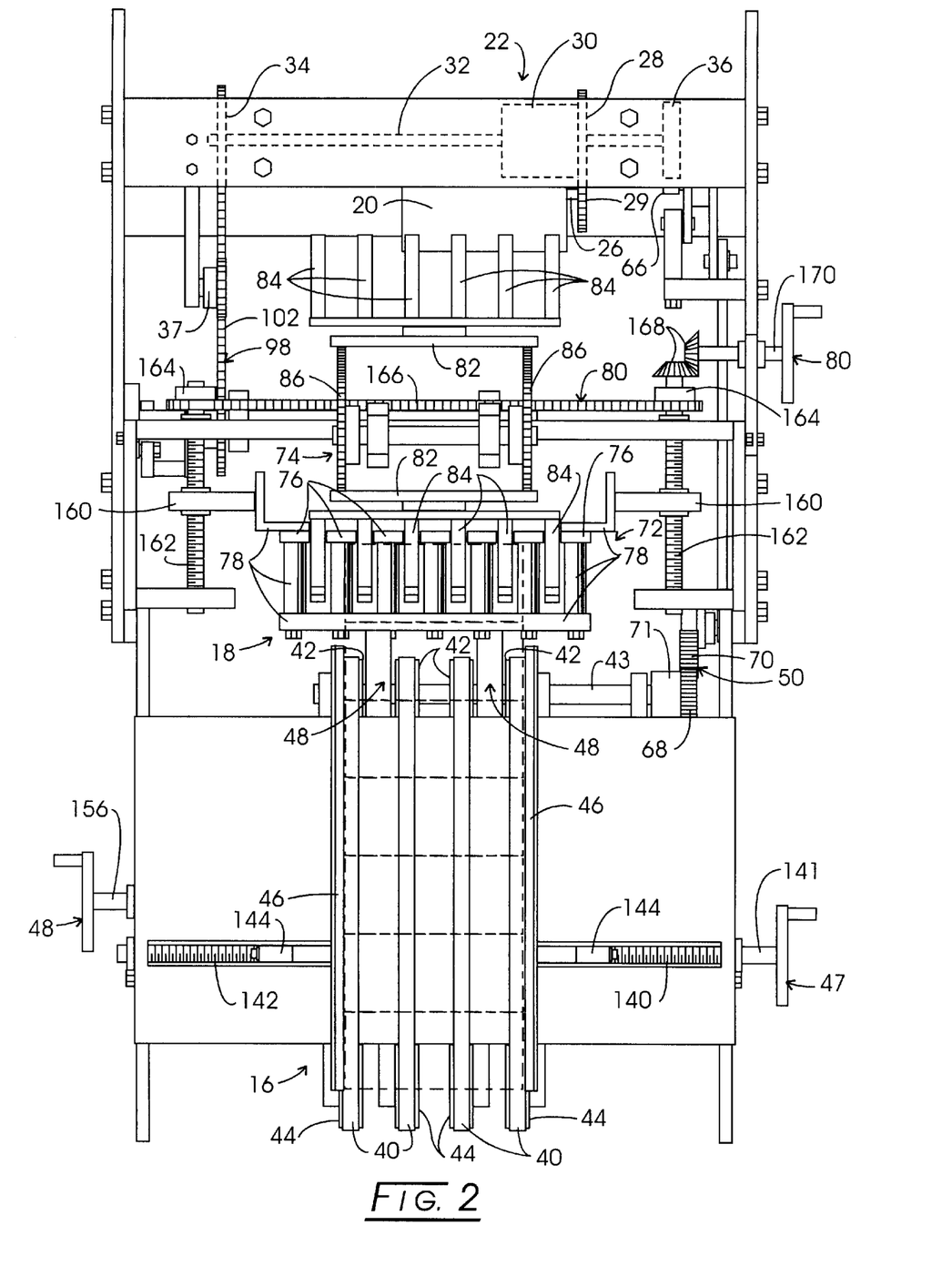
FIG. 2 is a schematic top plan view of the apparatus of FIG. 1.
Figure 3:
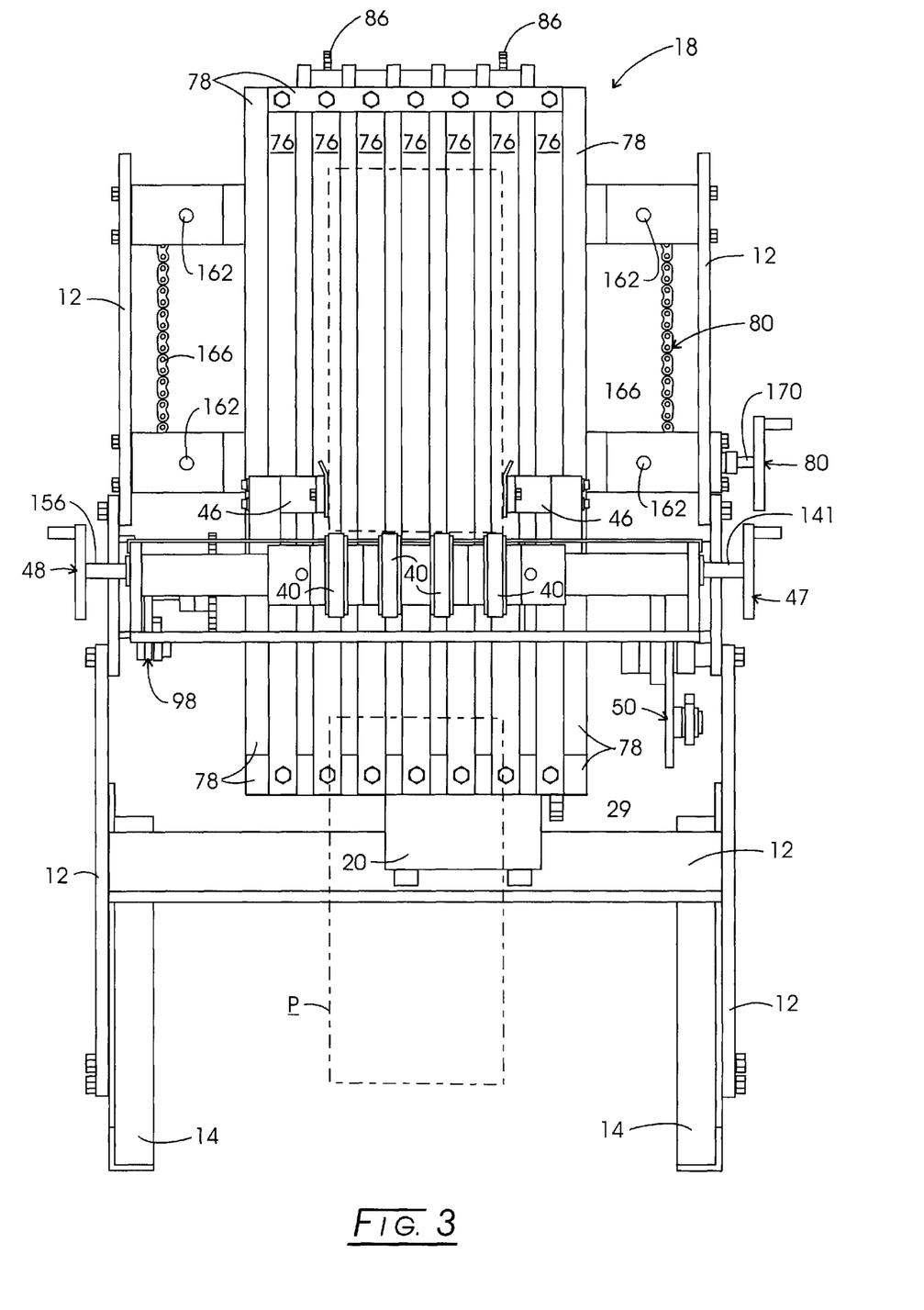
FIG. 3 is a schematic front elevation view of the FIG. 1 apparatus.
Figure 5:
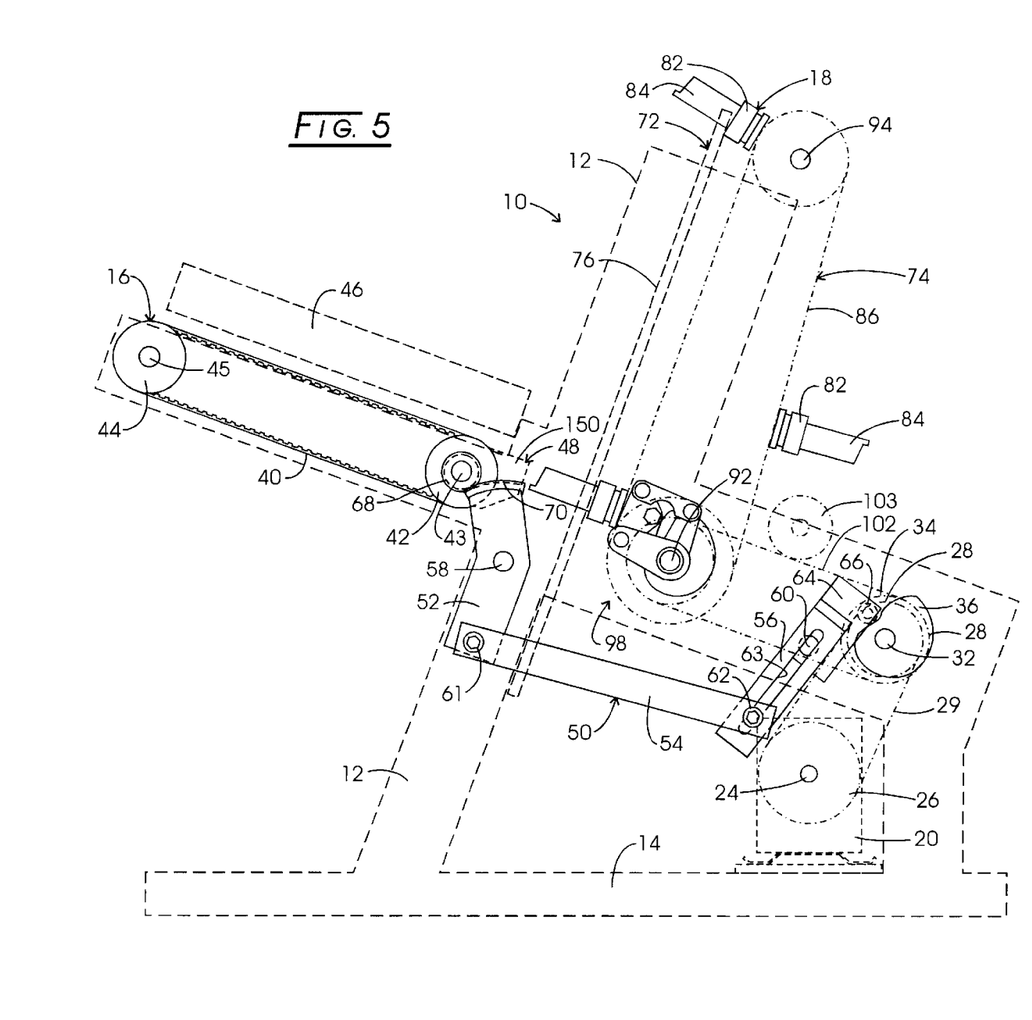
FIG. 5 is a side elevation view which schematically illustrates the drive train for the co-operating unit-feeder and unit-picker subassemblies of the apparatus of FIGS. 1 through 4.
Figure 6:
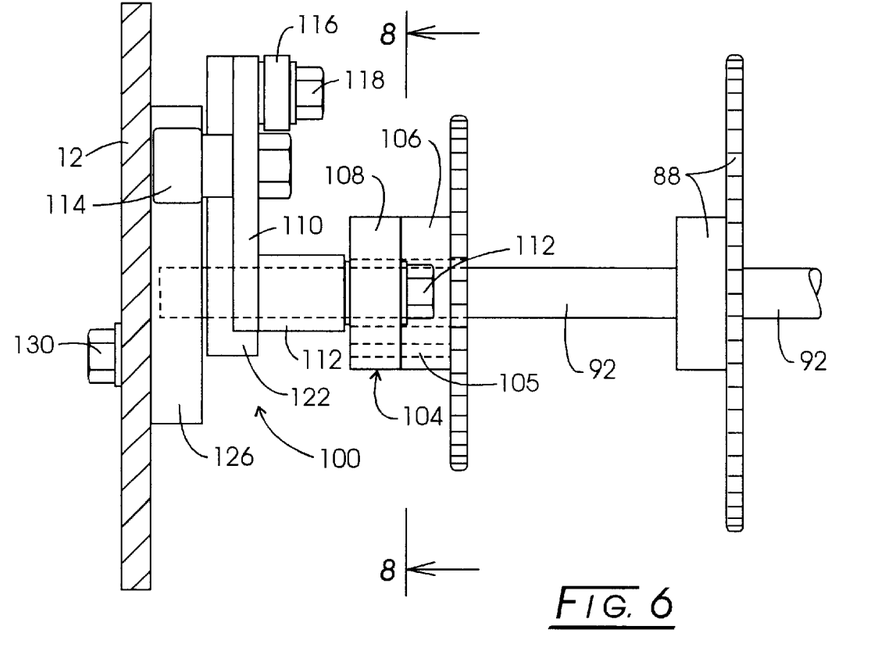
FIGS. 6 and 7 are top pan views, respectively, of a unit-picker subassembly linkage that varies the linear velocity of unit-picker subassembly picker-flight elements shown in two different operating positions during an incremental picker-flight element advancement.

Referring to FIGS. 2 and 5, unit-feeder subassembly 16 is principally comprised of multiple endless rubber gear belts 40 which co-operate with toothed drive sprockets 42 mounted on a drive shaft 43 and with follower sprockets 44 keyed to shaft 45 and upon which the stacked product units P are supported and carried, of adjustable side rails 46 and their manual separation control mechanism 47, of a manual delivery gap control mechanism 48, and of a subassembly drive train 50 that co-operably connects subassembly 16 to apparatus cam element 36. Gear belts 40 are tensioned by spring assembly 49 shown in FIG. 11. Unit-feeder subassembly shaft elements 43 and 45 are each rotatably supported by apparatus frame 12.

Subassembly drive train 50 is best illustrated in FIG. 5 as being essentially a three-bar linkage comprised of gear-segment bar 52, intermediate bar 54, and bar 56 having an adjustable effective length. Bars 52 and 56 co-operate with and are reciprocally rotated about fixed pivot points 58 and 60, respectively, and are connected to intermediate bar 54 by fixed pivot connection 61 and by adjustably-positioned pivot connection 62. Bar 56 has an attached extension 64 that carries the cam follower 66 which co-operates with cam element 36 of machine drive train 22. Bar element 52 includes a sector gear 70 that meshes with a toothed gear 68 rotatably mounted on drive shaft 43, and that through a so-called "one-way" clutch bearing (e.g., Torriington Type DC roller clutch) 71 couples gear 68 to drive shaft 43 and thereby imparts only one-way, incremental rotational motion to subassembly shaft element 43.

Adjustments to drive train 50 so that unit-feeder apparatus 16 can properly feed product units of different thicknesses are made by changing the position of pivot connection 62 in co-operating longitudinal slot 63 which changes the effective length of bar element 56 to thereby change the stroke of arm 52. These changes adjust the distance the endless rubber gear belts 40 are advanced with each complete revolution of cam element 28. Ideally, the distance of each belt incremental advance is equal to the thickness of a single product unit P.

Also, referring to FIGS. 2 and 5, unit picker subassembly 18 is principally comprised of an adjustable stop subassembly 72 carried by apparatus frame 12, and a fixed-position, variable-velocity, unit-picker subassembly 74 also carried by apparatus frame 12. Stop subassembly 72 positions a product unit to be picked on unit-picker subassembly 18. Subassembly 72 is comprised of spaced-apart stop-bar elements 76, stop frame elements 78 connecting stop bars 76 into a unitary structure, and a hereinafter-described, manually-powered position adjustment feature 80 that is utilized to position subassembly 72 properly with respect to subassembly 74 so that the projecting picker finger elements 84 carried by apparatus picker flights 82 are positioned properly in relation to the thickness of the product units being picked from unit-feeder subassembly 16 and delivered by apparatus 10 for shipment.

Unit-picker subassembly 74 is comprised of multiple, spaced-apart, product picker flights 82 that are attached to endless drive chains 86 and that each include and carry multiple product picker fingers 84. Endless drive chains 86 cooperate with drive sprockets 88 and follower sprockets 90 which respectively are keyed to a drive shaft 92 and a follower shaft 94. Such shafts are rotatably supported in apparatus frame 12. A drive train subassembly 98 connects drive shaft 92 to the output sprocket 34 of apparatus drive train 22. It should be noted that gearing ratios in apparatus 10 are controlled so that one revolution of apparatus drive shaft 32 causes but one revolution of drive shaft 92, that one revolution of unit-picker subassembly drive shaft 92 causes each picker flight 82 attached to endless chains 86 to be advanced through but one pick cycle, and also that one revolution of unit-picker subassembly drive shaft 32 causes but one cycle of reciprocation of linkage bar 52 of unit-feeder subassembly drive 50.

Drive train means 98 is detailed best in FIGS. 6 through 10 of the drawings, and principally inclincludes a velocity-modification linkage 100 which functions to provide a so-called "soft-touch" characteristic or capability to picker finger elements 84 and picker flights 82 as each such element nears and initially contacts a product unit for picking and delivery. Drive chain 102 co-operates with a sprocket element 106 in linkage 100 and is driven by drive sprocket 34 of drive train 22. A conventional chain tensioning assembly 103 contacts drive chain 102 and maintains the same in a proper taut condition. Linkage 100, developing the velocity characteristics schematically and more clearly illustrated in FIG. 14(c), actually completely stops each flight 82/finger 84 combination just before product unit contact with a product unit P. The product-picking flights also stop completely following delivery of each picked product unit input signal sequence but that cessation of motion is caused by the inactivation of "one-revolution" clutch mechanism 30 in apparatus drive train 22. The point of picker flight zero aeration during one rotation or cycle of unit-picker subassembly drive shaft 92 is, because of the high rate of rotation of cam element 126, instantaneous in nature, and the picker-flight velocity that results from manual adjustment or repositioning of cam element 126 frequently is very near and sometimes precisely at the chain absolute zero velocity (acceleration reversal) position. However, the terms "zero velocity" and "zero acceleration" as used in this description and in the claims which follow are intended to include the near-zero as well as the absolute zero.

Figure 14:
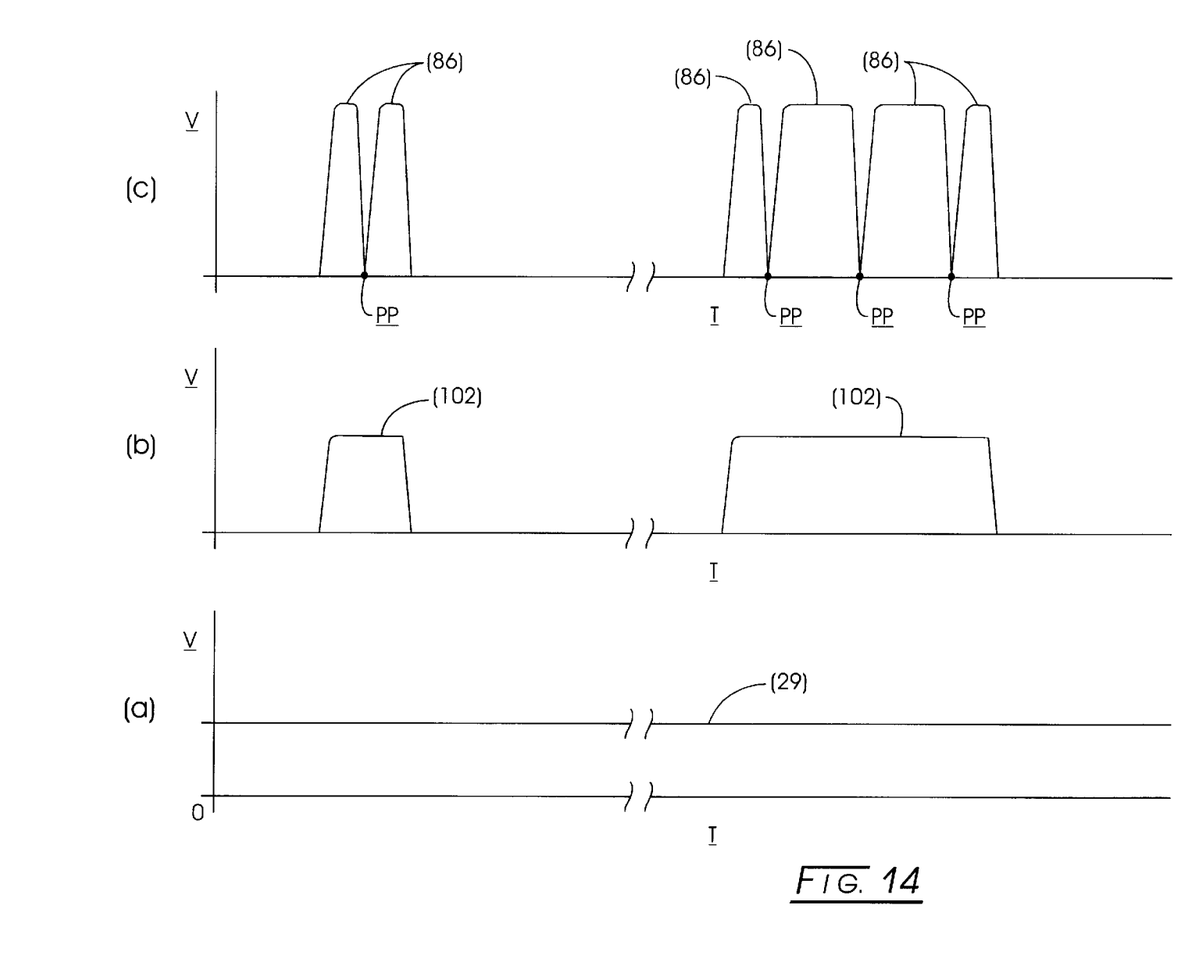
FIGS. 14(a) through 14(c) are graphs schematically illustrating representative drive chain and picker flight linear velocity conditions simultaneously existing in the invention apparatus during the picking and delivery of product units.

Note from FIG. 14 that all velocities V are illustrated as a function of time T, and that the linear velocity V (29) of drive chain 29 has a constant and continuous value, that the linear velocity V (102) of drive chain 102 which connects linkage 100 to sprocket 34 of apparatus drive train 22 intermittently falls to a zero value as the result of operation of clutch mechanism 30 in drive train 22, and that the linear velocity V (86) of drive chains 86 in the apparatus unit-picker subassembly is modified by the functioning of linkage 100 so as to additionally have a zero value at the intermediate pick point pp which coincides with initial product unit contact by flight picker fingers 84. Also note that FIG. 14 schematically illustrates two picking sequences; the first is for picking but a single product unit P whereas the second sequence is for a picking of three product units P.

Figure 15:
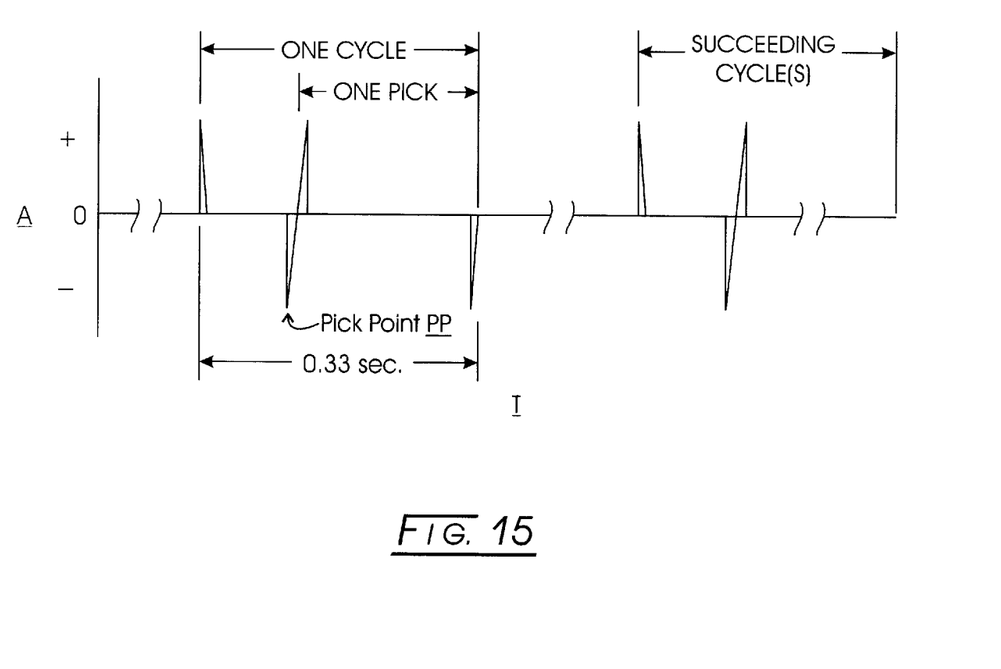
FIG. 15 is a graph illustrating schematically picker flight accelerations which typically occur during a picking sequence performed by the invention apparatus.

In FIG. 15 we illustrate the picker flight linear velocity changes that are achieved with velocity-modification linkage 100 in the form of acceleration/deceleration A changes as a function of time T. The 0.33 second time value included in FIG. 15 relates to apparatus picking at a rate of approximately 180 product units per minute. Also, as will be developed in the following more-detailed description of velocity-modification linkage 100, the time position of pick point pp of each product unit pick relative to the beginning and end of the machine incremental pick cycle period can be time-shifted within a unit delivery cycle by repositioning the timing cam included in velocity modification linkage mechanism 100 to accommodate picking product units of a different height.

Referring to FIGS. 6 through 10, velocity-modification linkage 100 is basically comprised of: crank 104 that is pinned to sprocket 106 (which is driven by chain 102 and sprocket 34 of drive train 22, and which rotates freely about shaft 92) and that has an integral crank arm 108; link 110 (that is connected to crank arm 108 by pivot connection 112 and carries cam follower element 114); link 116 (that is connected to link 110 by pivot connection 118 and that is provided with an integral clearance relief cut 120); and crank arm 122 (that is rigidly secured to drive shaft 92 by set screw device 124 and that is connected to link 122 by pivot connection 121). Linkage 100 further comprises timing cam 126 rigidly affixed to frame 12 (which guides movement of cam follower element 114 as linkage crank arm 108 makes a complete revolution about shaft 92); and torsion spring 128 (that is connected at each end to one of crank arms 108 and 122 and that functions to "open" linkage 100 following its "closure" as a result of cam follower 114 riding over the continuously curved segment of cam element 126).

Another embodiment of linkage 100 not detailed in the drawings eliminates the need of having a torsion spring element such as 128 in the linkage. Basically, the alternate embodiment has cam follower 114 co-operating with a recessed, essentially uniform-width, groove that is included in rotatable cam element 126, that has a groove plan configuration that corresponds to the configuration of the cam surface of illustrated cam element 126, and that achieves the required cam follower return or closure movement.

Figure 7:
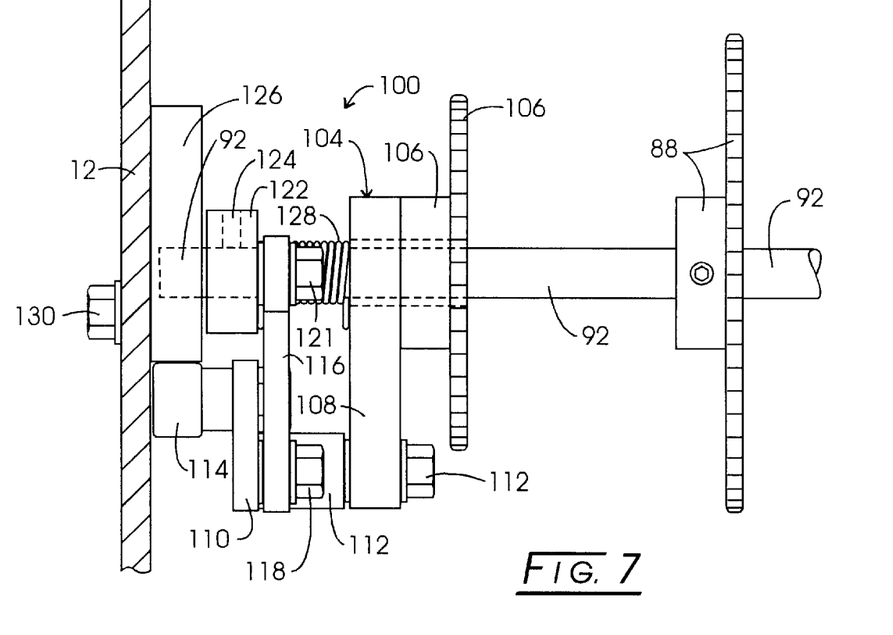
Figure 8:
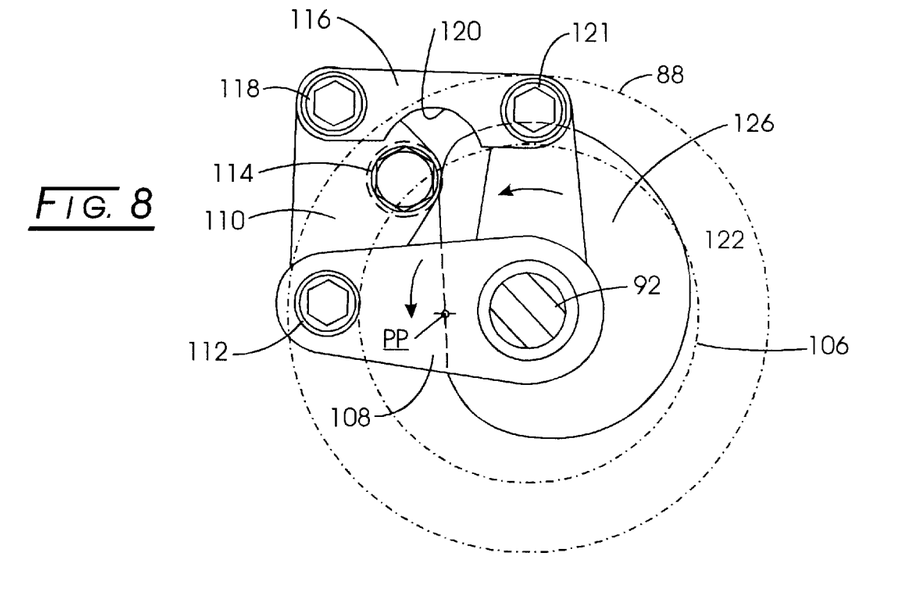
FIGS. 8 and 9 are end elevation views of the linkage illustrated in FIGS. 6 and 7 for the two different linkage operating positions.
Figure 9:
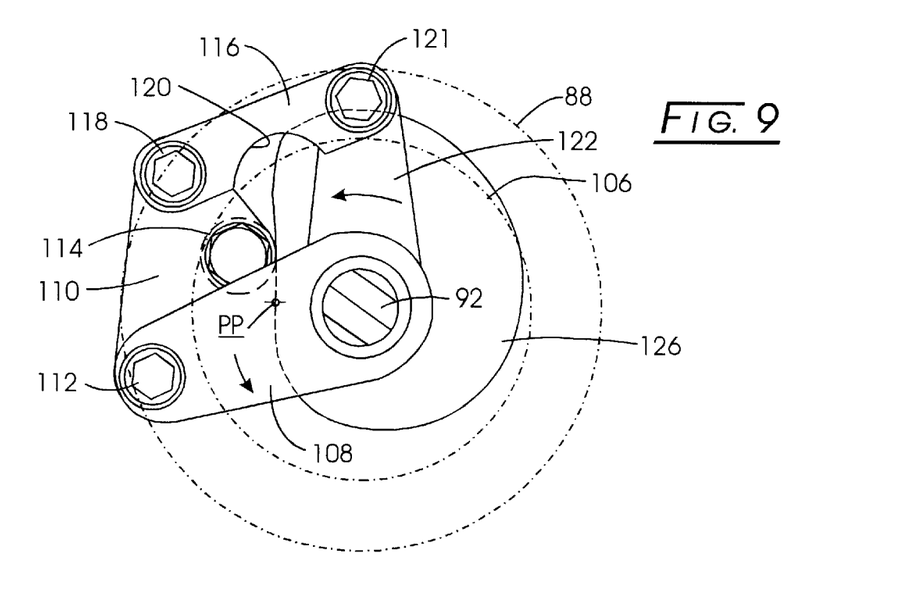

From the above it may be seen that input drive sprocket 106 is connected to power out shaft 92 through links 108, 110, 116 and 122. Because drive sprocket 106 rotates at constant speed, drive arm 108 which is rigidly affixed thereto also rotates at a constant speed. As mentioned previously drive arm 108 is attached to link 110 through a pivoted connection 112. Link 110 includes a cam follower 114 fixedly mounted thereon. Follower 114 rides along the outer surface of a fixed cam 126 rigidly mounted to a frame member 12. Referring to FIG. 7, it may be seen that a spring 128 acts to bias links 108 and 122 apart. It also serves to keep follower 114 in position with respect to cam 126. As follower 114 traverses the outer surface of cam 126 it causes link 110 to move radially inwardly and outwardly and to thereby pivot link 110 about pivot 112. This in turn causes pivot 118 to move radially inwardly and outwardly. As pivot point 113 is moved radially outwardly, link 116 moves radially outwardly which in turn causes link 122 to be rotated towards arm 108 and against the rotational direction of arm 108. Because link 122 is rigidly affixed to output shaft 92 this in turn causes the rotation of shaft 92 to increase.

Conversely, when cam follower 114 traverses the outer surface of cam 126 and is moved radially inwardly, such causes pivotal connection 118 and link 116 to move radially inwardly. This in turn speeds the rotation of pivot point 121 and link 122 away from arm 108 to cause link 122 and shaft 92 to slow down and in some cases come to almost a complete stop.

In summation, follower 114 simply causes pivot 118 to move radially inwardly and outwardly as it traverses the outer surface of cam 126. This causes a scissors action with respect to links 108 and 122 in that it causes them to move toward and away from each other. As link 122 is moved towards arm 108 shaft 92 is speeding up. When link 122 is moved away from arm 108 the rotational speed of shaft 92 is decreased. Timing cam 126 also has a pick-point pp (see FIGS. 8 and 9) where its cam surface has a minimum radius that during one revolution of timing cam 126 coincides time-wise with and establishes the position of pick-point pp noted in FIGS. 14 and 15.

As described in the previous discussion relating to FIG. 14, linkage 100 functions to modify the linear velocity of unit-picker subassembly flight/finger combinations 82/84 from the velocity condition of FIG. 14(b) to that shown in FIG. 14(c) by varying the rate of rotation of drive shaft element 92 with a complete cessation of shaft rotation occurring at the product unit pick-point pp where a flight finger 84 initially contacts a product unit. It is also possible to accomplish the linear velocity modification function associated with linkage 100 with included electronic circuit means in preference to a pure mechanical component construction.

Figure 10:
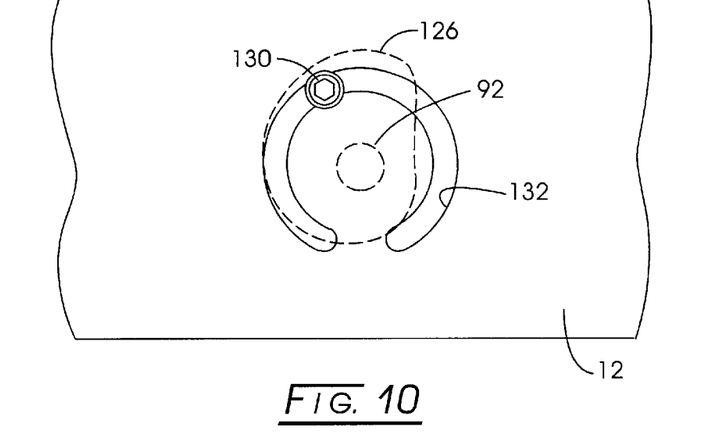
FIG. 10 is a side elevation view of a portion of the apparatus of FIGS. 1 through 4 illustrating apparatus components for adjusting the unit-picker subassembly linkage of FIGS. 6 through 9 to accommodate product units of different heights.

FIG. 10 best illustrates the construction features provided in apparatus 100 to vary the position of pick point pp in a product unit pick to accommodate product units of different height. Such basically involves rotation of cam 126 relative to drive shaft 92 and apparatus frame 12, and is accomplished by loosening threaded lock-screw 130 which engages a correspondingly threaded hole in timing cam 126 and which co-operates with circular slot 132 provided in apparatus frame 12, rotating timing cam 126 to its appropriate new position, and re-tightening threaded lock-screw 130 to securely clamp timing cam 126 to apparatus frame 12.

Figure 11:
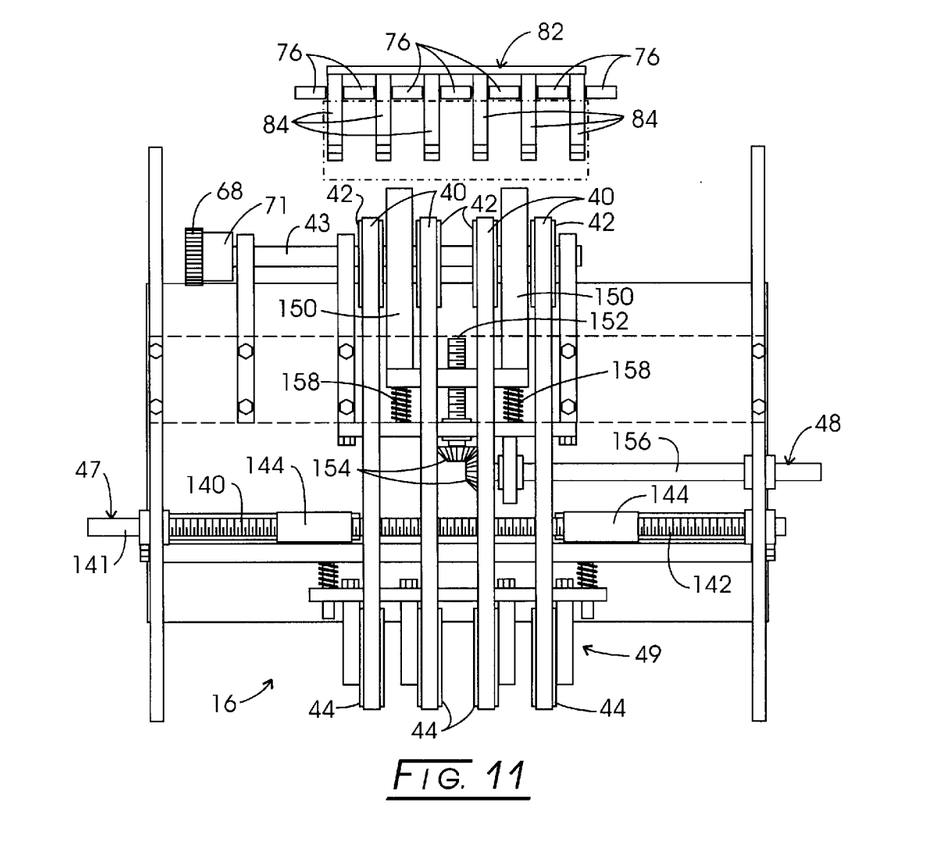
FIG. 11 is an underside plan view of a portion of the apparatus of FIGS. 1 through 4 illustrating apparatus components for adjusting the apparatus unit-feeder subassembly to accommodate product units of different widths and thicknesses.

FIG. 11, which essentially is a partial view of apparatus 10 from beneath unit-feeder subassembly 16, provides details of the manual centering mechanism which adjustably controls the separation positioning of side rails 46 of unit-feeder subassembly 16. Such mechanism is essentially a manually-turned lead screw 47 mounted in frame 12 and having opposed left-hand and right-hand screw-threads 140 and 142, respectively, that cause co-operating rail supports 144 to simultaneously advance toward or from the center of unit-feeder subassembly 16 depending on the direction of rotation of lead screw 47. Side rails 46 (see FIG. 2) are connected to and supported by adjustable rail supports 144.

Figure 12:
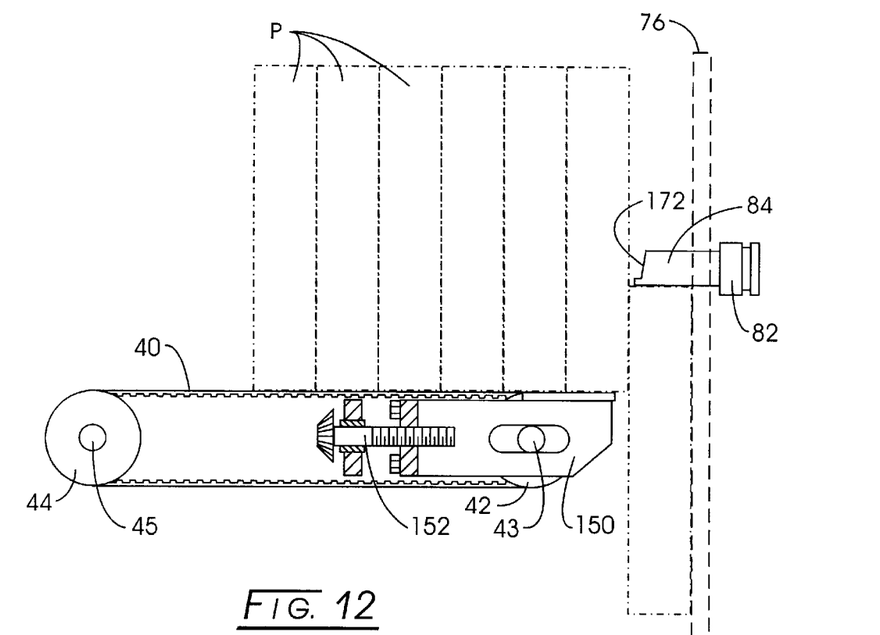
FIGS. 12 and 13 are side section views of portions of the apparatus of FIGS. 1 through 4 illustrating apparatus components for adjusting the product delivery gap situated intermediate the unit-feeder and unit-picker subassemblies to accommodate product units of different thicknesses.
Figure 13:
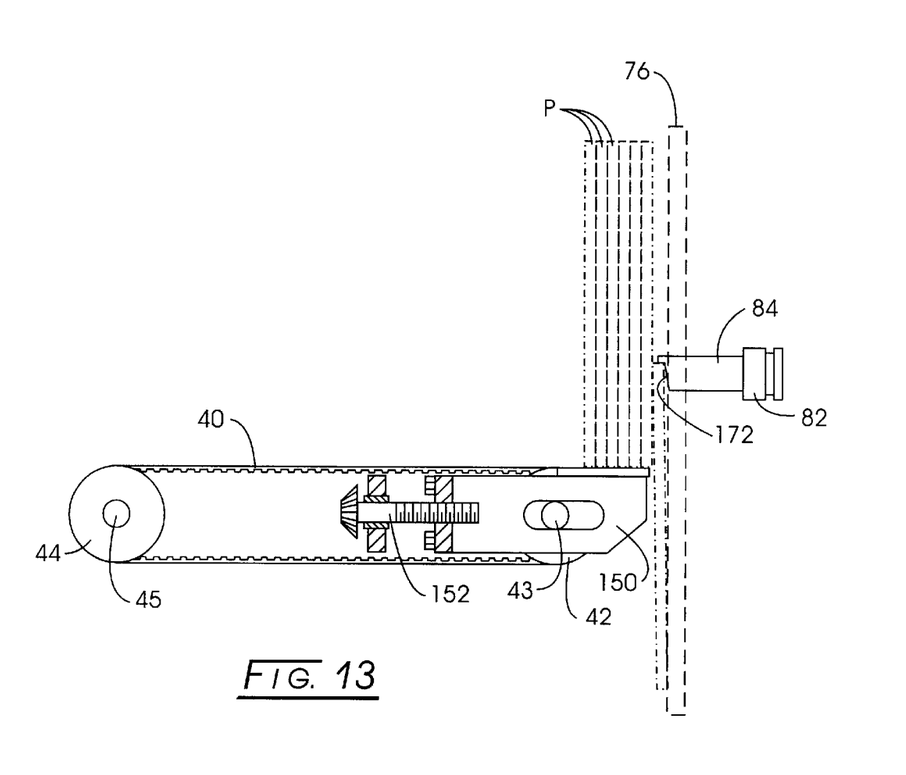

FIGS. 11 through 13 illustrate details of the manually-operated apparatus product-delivery gap adjustment mechanism 48 that is provided at the outer end of unit-feeder subassembly 16 to adjust the gap between unit-feeder subassembly 16 and unit picker subassembly 18 through which product units are dispensed downwardly into chute 19. Adjustment of the gap ems that only one product unit is dispensed each time product unit delivery apparatus 10 is actuated. n other words, such gap adjustment achieves preferred apparatus picking of product units of different thickness. Mechanism 48 includes a pair of joined feeder bed extension rails 150 that are extended and retracted by co-operating lead screw 152. Lead screw 152 in turn is driven by co-operating bevel gears 154 and input shaft 156. Compression springs 158 are included to assure full extension of extension rail elements 150. FIGS. 12 and 13 schematically illustrate the positioning of extension rail elements 150 for comparatively thick and thin product units, respectively. The adjustable-width apparatus product delivery gap which exists between the stop bars 76 of stop subassembly 72 and the projecting ends of extension rails 150 is preferably just a little larger than the thickness of the product units to be picked by flight finger element 84. However, before setting the position of extension rail elements 150 to accommodate a given product unit thickness change, it is necessary to properly position stop assembly 72 relative to unit-picker subassembly 74 so that the fingers attachments 84 attached to picker flight elements 82 project a little less than the thickness of a product unit beyond the outer face of stop bar elements 76.

Figure 4:
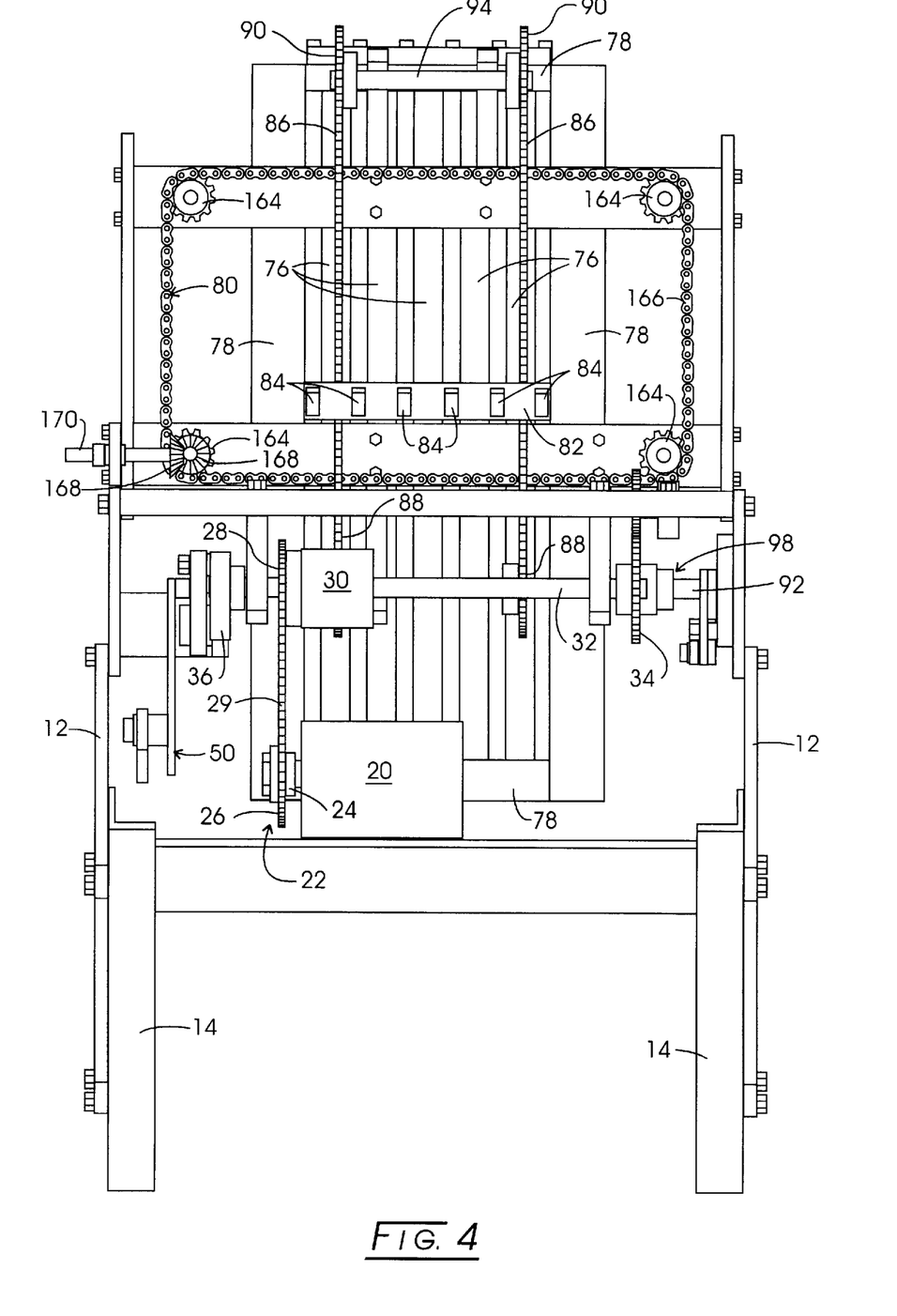
FIG. 4 is a schematic rear elevation view of the FIG. 1 apparatus.

Drawing details of apparatus mechanism 80 for adjusting the position of stop subassembly 72 relative to the fixed position of unit-picker subassembly 74 are best seen in FIGS. 2 and 4. Basically, threaded openings in the frame 160 which supports and carries joined stop bar elements 76 co-operates with frame-mounted lead screws 162 that each carry a key-joined sprocket 164. Endless chain 166 co-operates with each such mechanism 80 sprocket. In addition, mechanism 80 includes co-operating bevel gears 168 that are attached to one of lead screws 162 and to manually-turned input shaft 170. As suggested above, it is necessary to properly adjust the position of stop bar elements 76 relative to the path of flight finger elements 84 for proper finger-to-product unit initial contact before properly adjusting the position of unit-feeder extension rails 150 relative to stop bar elements 76.

We have also discovered that the picking of individual product units from a stack of very-thin product units such as printed pamphlets may pose a problem that arises out of lack of product unit stiffness or rigidity. To overcome this particular problem in apparatus 10 we utilize a multi-function flight finger 84. As shown in FIGS. 12 and 13, each element 84 in the picker-unit subassembly may be inverted from its FIG. 12 orientation to its FIG. 13 orientation simply by rotating the element about its longitudinal rotational axis 180°. (Not detailed in the drawings are the included conventional pivot and detent construction features that join picker finger element 84 to picker flight element 82 to make that picker finger element invertible). Such inverting step then presents an included offset picker finger sloped end surface 172 to the product unit P upper edge at the moment of initial contact; such sloped end surface includes a lip segment that projects transversely and that last makes finger contact with the product unit P being picked to more positively transport that product through the apparatus product delivery gap in a downward direction. Such has been observed to prevent the product unit being picked from otherwise buckling.

From an operating standpoint, apparatus 10 can function without the velocity-modification linkage 100 being incorporated into drive shaft 92 of unit-picker subassembly 74, although depending upon the overall product unit picking rate of apparatus 10, damage to product units might occur because of the large magnitude of product contact forces associated with very high picker flight and flight picker finger linear velocities. The machine operating method introduced by utilization of velocity-modification linkage 100 involves the cyclical simultaneous steps of: (1) operating electric motor 20 and the drive train 22 connected to clutch mechanism 30 continuously; (2) upon receipt of a command signal directing apparatus 10 to pick a product unit or sequence of units from unit-feeder subassembly 16, activate clutch mechanism 30 to thereby cause the prescribed number of complete revolutions of drive shaft 32, attached sprocket 34, and attached cam 36 to thereby simultaneously drive unit-feeder drive train 50 and unit-picker drive train 98; (3) advance the endless belts 40 of unit-feeder subassembly 16 incrementally by the thickness of the number of product units in the command sequence and simultaneously, incrementally, and correspondingly advance the endless chains 86 and attached picker flights 82, the linear velocity of each picker flight 82 being slowed to zero or near-zero at the time of flight finger 84 contact with each product unit being picked and immediately thereafter resuming its original linear velocity. This so-called "soft touch" feature of apparatus 10 is accomplished through the functioning of velocity-modification linkage 100 or another and alternate functionally equivalent device.

After picker flights 82 have moved through the prescribed or ordered number of incremental chain 86 movements, their velocity is reduced to zero by the deactivation of clutch mechanism 30 in drive train 22. The cycle is then ready for re-starting on receipt of the next command signal from the controlling order-filling system computer. To date we have been able to achieve product unit picking rates of as much as approximately 180 product units per minute.

Various changes may be made to the size, shape, and materials of construction of the apparatus component parts described above without departing from the scope, meaning, or intent of the claims which follows.

We claim our invention as follows:

1. Product unit-delivery apparatus that incrementally selects and delivers different quantities of a product unit from a stack of product units in response to computer-controlled apparatus input signals received from an automated order filling system, and comprising, in combination:

an adjustable-width apparatus product delivery gap having a pair of opposed sides;

an apparatus product delivery chute co-operating with said adjustable-width apparatus product delivery gap;

a product unit-feeder subassembly contiguous to and defining the position of one side of said adjustable-width apparatus product delivery gap, having a conveyor belt which supports a group of staked product units, and having a unit-feeder drive which incrementally advances said multiple conveyor belts toward said apparatus product delivery gap;

a product unit-picker subassembly contiguous to and defining the position of the other side of said adjustable-width apparatus product delivery gap, having multiple product-picker flights which move on a path that intersects said adjustable-width apparatus product delivery gap, and having a unit-picker drive which incrementally advances said multiple product-picker flights in response to a received apparatus electrical/electronic input signal and into contact with product units supported and advanced by said product unit-feeder subassembly; and an apparatus drive having an intermittently activated/deactivated clutch means that movably power said product unit-feeder subassembly unit-feeder drive and said product unit-picker subassembly unit-picker drive, said product unit-picker subassembly multiple product-picker flights, when incrementally and sequentially advanced by said product unit-picker subassembly unit-picker drive and said apparatus drive means, causing rapid sequential downward movement of a computer-controlled number of product units through said apparatus product adjustable-width delivery gap and into said apparatus delivery chute.

2. The product unit-delivery apparatus defined by claim 1, and wherein said product unit-picker subassembly unit-picker drive further includes a velocity-modification means modifying the linear velocity of said product unit-picker subassembly multiple product-picker flights during operation of said product unit-picker subassembly unit-picker drive, said velocity-modification means reducing the velocity of said product unit-picker subassembly product-picker flights to zero or near zero velocity concurrent with each initial contact between one of said multiple product-picker flight and a product unit.

3. The product unit-delivery apparatus defined by claim 2, and wherein said product unit-picker subassembly unit-picker drive includes a drive shaft functionally connected to and powering said unit-picker subassembly multiple product-picker flights, and wherein said product unit-picker subassembly unit-picker drive velocity-modification means is a mechanical linkage which varies the rate of rotation of said product unit-picker subassembly unit-picker drive shaft.

4. The product unit-delivery apparatus defined by claim 1, and wherein said product unit-picker subassembly unit-picker drive establishes a time-positioned pick-point in the linear path traversed by said product unit-picker subassembly multiple product-picker flights, said product unit-picker subassembly unit-picker drive pick-point being concurrent in time with initial contact of a product unit-picker subassembly product-picker flight with a product unit.

5. The product unit-delivery apparatus defined by claim 4, and wherein said product unit-picker subassembly unit-picker drive includes an adjustable velocity-modification means modifying the linear velocity of said product unit-picker subassembly multiple product-picker flights during operation of said product unit-picker subassembly unit-picker drive, said adjustable velocity-modification means varying the time-position of the time-positioned pick-point established by said product unit-picker subassembly unit-picker drive when adjusted.

6. The product unit-delivery apparatus defined by claim 5, and wherein said product unit-picker subassembly unit-picker drive includes an adjustably-positioned timing cam element, said adjustably-postioned timing cam element, when repositoned, repositioning the timepositioned pick-point established by said product unit-picker subassembly unit-picker drive to another time-position that is intermediate the time positions of sequential activation/deactivation of said apparatus drive clutch means.

7. The product unit-delivery apparatus defined by claim 1, and wherein said product unit-feeder subassembly includes adjustably-positioned extension rail elements interspersed with said product unit-feeder subassembly multiple conveyor belts, and means for longitudinally extending and retracting said extension rail elements, ends of said adjustably-positioned extension rail dements in-part defining the position of one side of said adjustable-width apparatus product delivery gap.

8. The product unit-delivery apparatus defined by claim 1, and wherein said product unit-picker subassembly includes an adjustably-positioned product unit stop, and means for adjusting the position of said product unit stop relative to said product unit-feeder subassembly, said product unit stop in part defining the position of one side of said adjustably-width apparatus product delivery gap.

9. The product unit-delivery apparatus defined by claim 1, wherein said product unit-picker subassembly has an adjustably-positioned, product unit stop subassembly that includes multiple, spaced-apart and substantially vertical, product unit stop bar elements, wherein said product unit-picker multiple product-picker flights have multiple, spaced-apart and attached, projecting product-picker fingers whose movement paths are interspersed between said multiple, spaced-apart and substantially vertical, product unit stop bar elements, and wherein said product unit-picker subassembly includes means for adjusting the position of said adjustably-positioned, multiple, spacedpart and substantially vertical, product unit stop bar elements, the positions of said adjustably-positioned product unit stop subassembly stop bar elements being interspersed with the position of the paths of said product unit-picker subassembly product picker flight projecting product-picker fingers.

10. The product unit-delivery apparatus defined by claim 9, and wherein the distance that said unit-picker subassembly product picker flight attached spaced-apart product-picker fingers project beyond said unit-picker subassembly product unit stop subassembly stop bar elements toward said product unit-feeder assembly approximates but does not exceed the thickness of the product unit being picked.

11. The product unit-delivery apparatus defined by claim 9, and wherein said product unit-picker multiple product-picker flight multiple, spaced-apart and attached projecting product-picker fingers are rotatable about a longitudinal axis and invertible relative to said unit-picker subassembly product picker flights, said projecting product picker fingers having sloped and lipped end surfaces that initially contact the product unit being picked.

12. The product delivery-unit apparatus defined by claim 1, and wherein apparatus drive includes an intermittently rotated drive cam, and wherein said product unit-feeder subassembly drive includes a product unit-feeder subassembly drive shaft rotationally connected to said product unit-feeder subassembly conveyor belts, a product unit-feeder drive gear freely mounted on said product unit-feeder subassembly drive shaft, a one-way clutch device connecting said product unit-feeder subassembly drive gear to said product unit-feeder subassembly drive shaft, an adjustable-length reciprocating linkage connecting said apparatus drive cam to said product unit-feeder subassembly drive gear in motion transmitting relation, the length of said adjustable reciprocating linkage being adjusted to impart, in one complete linkage motion cycle, one-way movement of said product unit-feeder multiple conveyor belts through a distance corresponding to the thickness of the product unit being picked.

13. An apparatus that is for intermittently picking and delivering product units from a stack of product units and that has a feeder conveyor which supports and feeds the stack of product units toward a product unit stop and a picker conveyor which has movable flights that intermittently contact and remove individual product units from the product unit stack, in combination, a product unit delivery gap positioned intermediate said feeder conveyor and said product unit stop and through which product units and said picker conveyor flights pass when delivering product units.

14. The apparatus defined by claim 13, and wherein said feeder conveyor and said product unit stop are movable relative to each other and relatively moved to thereby change the width of said product unit delivery gap.

15. In a method of operating a product unit-delivery apparatus having incrementally moved multiple product-picker flights that sequentially pick and transport for delivery a product unit from a stack of product units, the step of causing each said product-picker flight to initially contact its respective product unit with near-zero velocity.

* * * * *